United States Patent

[11] 3,599,915

[72] Inventor Edmund J. Soltysik
 Chicago, Ill.
[21] Appl. No. 883,981
[22] Filed Dec. 10, 1969
[45] Patented Aug. 17, 1971
[73] Assignee Illinois Tool Works Inc.
 Chicago, Ill.

[54] PIPE CLIP
 5 Claims, 11 Drawing Figs.
[52] U.S. Cl. ................................................. 248/68,
 248/70, 248/74
[51] Int. Cl. ........................................... F16l 3/08
[50] Field of Search ............................. 248/68, 69,
 74, 70; 24/73.7, 81.3, 81 CC

[56] References Cited
UNITED STATES PATENTS
1,462,671 7/1923 Vrba ............................ 248/74
2,440,469 4/1948 Goddard ...................... 248/68
2,466,912 4/1949 Rice ............................. 248/74
1,615,092 1/1927 Longanecker ............... 24/68 PP X
3,090,826 5/1963 Cochran ....................... 248/68
3,430,904 3/1969 Soltysik ....................... 248/68

Primary Examiner—Chancellor E. Harris
Attorneys—Olson, Trexler, Wolters and Bushnell, Robert W. Beart, Michael Kovac, Barry L. Clark and Jack R. Halvorsen ABSTRACT: A sheet material clip for securing pipes, tubing and the like to a support and having a portion formed for extending around pipes of different diameters and provided with an element adapted to engage and to be deformed by pipes of different diameters for securely retaining such pipes.

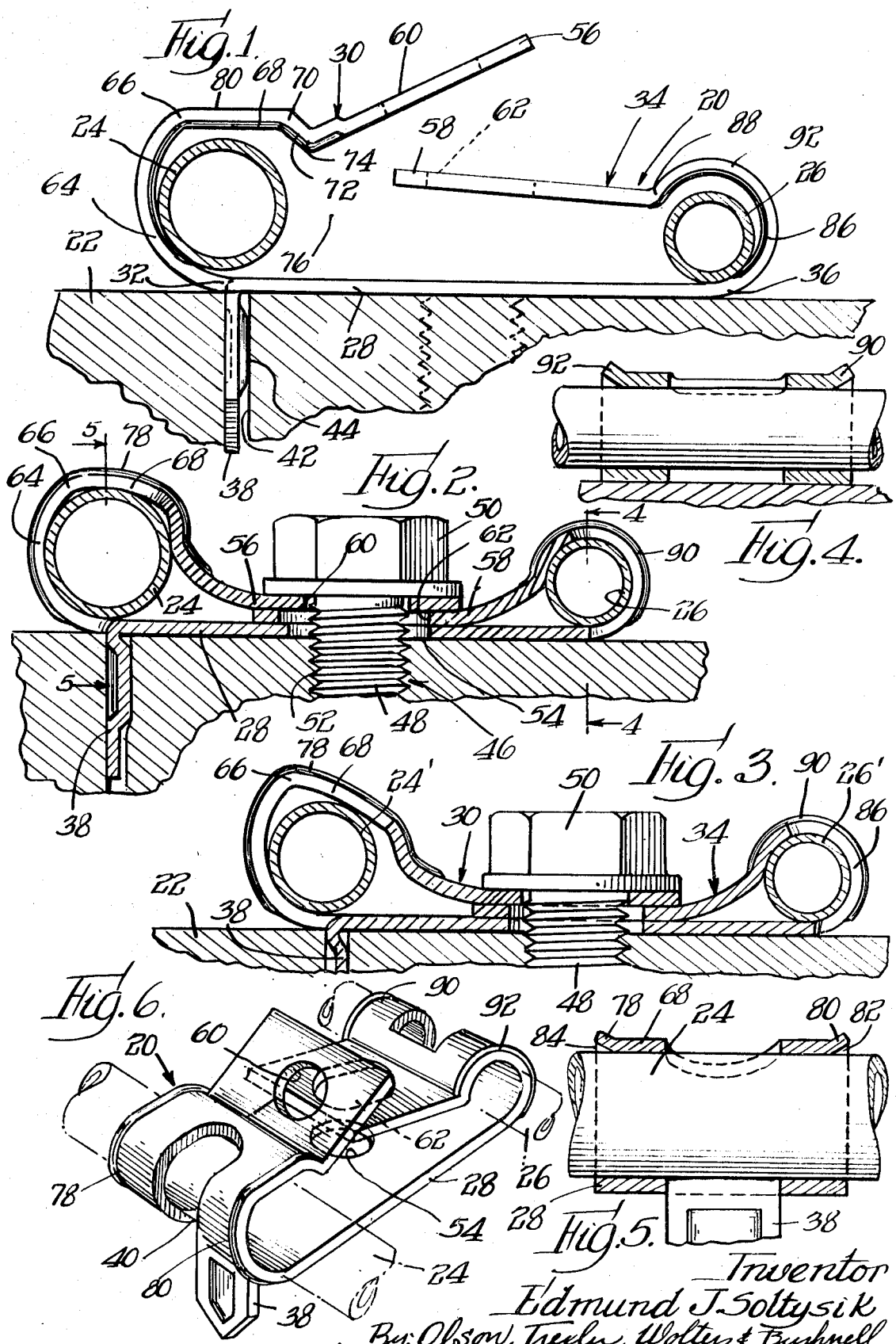

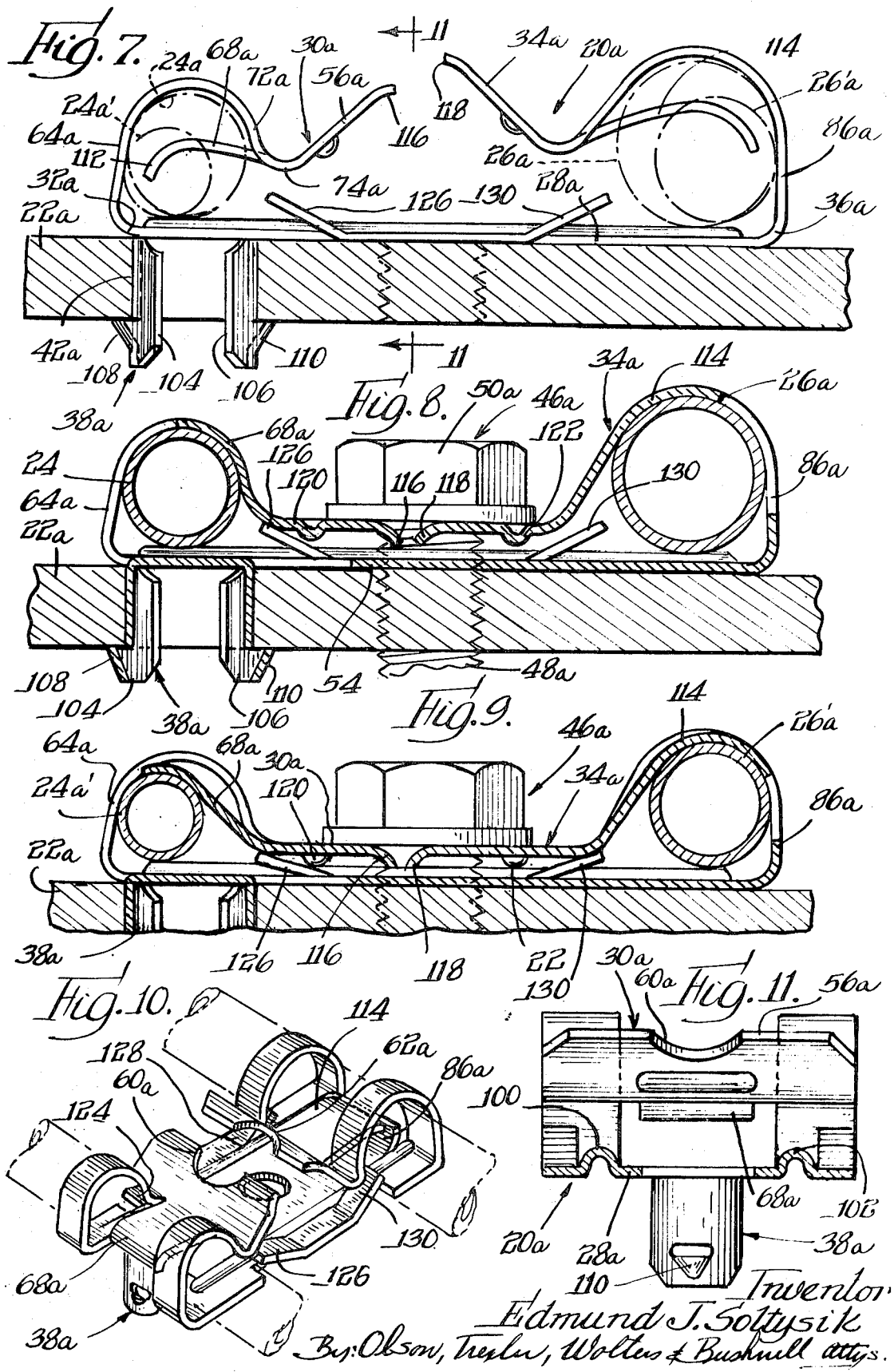

PIPE CLIP

The present invention relates to a novel device for securing elongated workpieces to a support, and more specifically to a novel clip device for securing one or more workpieces such as pipes, tubing and the like to a support.

While devices of the type contemplated herein may be adapted for use in a variety of installations, they are especially suitable for use in automotive vehicles for securing workpieces such as fuel or hydraulic pipes or tubing, conduits for control cables and the like. In such installations, the conduits, pipes or tubing frequently come in a variety of sizes or diameters.

It is an important object of the present invention to provide a novel fastening device or clip adapted to secure workpieces such as pipes, tubing and the like having different diameters.

A further object of the present invention is to provide a novel fastening device or clip of the above-described type which may be quickly and easily assembled with pipes or other workpieces of different diameters.

Still another object of the present invention is to provide a novel fastening device or clip of the above-described type which is constructed so as to facilitate mounting thereof with respect to a support member.

A still further object of the present invention is to provide a novel fastening device or clip of the above-described type which is of simple and economical construction.

A more specific object of the present invention is to provide a novel fastening device or clip for securing elongated workpieces such as pipes, tubing and the like to a support comprising a base portion, an arm portion extending outwardly from an integral junction with and doubled back over the base portion for retaining the workpiece, which arm portion is adapted to be clamped toward the base portion, and one of the arm or base portions including integral means engageable with and adapted to be formed around workpieces of substantially different diameters when the arm portion is clamped toward the base portion whereby the clip is adapted securely to retain workpieces of different diameters.

Other objects and advantages of the present invention will become apparent from the following description and the accompanying drawings wherein:

FIG. 1 is a partial sectional view showing a clip incorporating features of the present invention partially assembled with workpieces;

FIG. 2 is a partial sectional view similar to FIG. 1, but showing the clip fully assembled with the workpieces;

FIG. 3 is a partial sectional view similar to FIG. 2, but showing the clip assembled with workpieces of different diameters;

FIG. 4 is a fragmentary sectional view taken along line 4—4 in FIG. 2;

FIG. 5 is a fragmentary sectional view taken along line 5—5 in FIG. 2;

FIG. 6 is a perspective view showing the clip of FIGS. 1—5 partially assembled with a pair of workpieces;

FIG. 7 is an elevational view showing a modified form of the present invention partially assembled with a sectioned support member and showing, in broken lines, different sizes of workpieces such as pipes which may be secured by the clip member;

FIG. 8 is a partial sectional view showing the clip member of FIG. 7 assembled with relatively large diameter workpieces;

FIG. 9 is a partial sectional view similar to FIG. 8 and showing the clip member assembled with relatively small diameter workpieces;

FIG. 10 is a perspective view showing the clip member of FIGS. 7—9; and

FIG. 11 is a sectional view taken along line 11—11 in FIG. 7.

Referring now more specifically to the drawings wherein like parts are designated by the same numerals throughout the various figures, a fastener or clip member 20 incorporating features of the present invention is shown in FIGS. 1 through 6. The clip member is adapted to be secured to a support 22 which might, for example, be a panel, a beam, an engine block or any other desired part in a motor vehicle or other structure in which the clip is to be installed. The clip member 20 is adapted to secure a plurality of elongated workpieces such as pipes or tubes 24 and 26 in the manner described more fully below.

The clip member 20 is provided with an elongated base portion 28 which is preferably generally straight and flat and is adapted to be positioned in substantially abutting relationship against the support 22 in the manner shown. An arm portion 30 extends outwardly from an integral junction 32 with one end of the base portion 28 and another arm portion 34 extends outwardly from an integral junction 36 with an opposite end of the base portion. The arm portions 30 and 34 are respectively reversely folded or directed over the base portion for providing loops for receiving and retaining the workpieces or pipes 24 and 26.

The fastening device or clip member is provided with means for securing it with respect to the support 22. This means includes a laterally projecting prong or spud 38 extending from the base portion 28 oppositely from the arm portion 30. In the embodiment shown, the material for the prong is struck from the arm portions 30 so as to leave a slot 40 as shown best in FIG. 6. The prong or spud 38 is adapted to be inserted into an opening or slot 42 provided in the support 22 for accomplishing a preliminary attachment between the clip and the support. Preferably a rib or wedge element 44 is deflected from the prong 38 so as to accomplish a friction fit between the prong and the support 22 when the prong is inserted into the opening or slot 42 for minimizing any possibility of accidental disassembly. Final securing of the clip member with respect to the support 42 is accomplished with the aid of a bolt or screw 46 having a threaded shank 48 and an enlarged head 50. A complementary nut, not shown, may be provided for the bolt or screw, but in the embodiment shown, the support 22 has an internally threaded aperture 52 for receiving the shank 48.

In order to accommodate the screw or bolt 46, the base portion 28 of the clip member is provided with a central aperture 54 offset substantially from the prong or spud 38. In addition, free end sections 56 and 58 of the arm portions 30 and 34 are respectively provided with an aperture 60 and an elongated slot 62 for receiving the screw shank. The aperture 60 has a diameter substantially the same as the diameter of the screw shank so that when the screw is tightened as will be described more in detail below, the arm portion 30 is pulled by the screw tightly around a work piece or pipe enclosed thereby. The opening 62 may also be provided with a diameter similar to that of the screw, but in the embodiment shown, this opening is in the form of an elongated slot having a minor dimension similar to that of the diameter of the screw and a substantially greater major dimension whereby to facilitate alignment of the slot with the apertures 54 and 60 and assembly of the parts. It will be noted that when the screw member is tightened and the clip is fully assembled, screw member and the prong or spud 38 combine to lock the clip member with respect to the support and prevent turning or rotating of the clip member in a manner which rotation might cause undesirable kinks or bends to be formed in the workpieces or pipes.

In accordance with a feature of the present invention, the arm portion 30 is formed so that it is adapted securely to retain workpieces or pipes of different diameters. For example, FIGS. 1 and 2 show the arm portion 30 associated with a relatively large diameter pipe 24 while FIG. 3 shows the arm portion 30 securing a relatively small diameter pipe 24'. In order to accomplish this function, the arm portion is provided with an arcuate section 64 extending from the junction 32 with the base portion and having a curvature with a relatively large radius which is preferably similar to, but greater than, the largest pipe or workpiece to be accommodated by the clip. The section 64 merges at a junction 66 with another section 68 of the arm portion 30. As shown in FIG. 1, the section 68 initially is substantially straight and extends generally parallel to the base portion 28 and is spaced above the base portion a distance at least substantially as great as the diameter of the largest workpiece or pipe to be accommodated by the device.

An end of the arm section 68 opposite from the junction 66 merges at another junction 70 with a downwardly inclined arm section 72 which may have an arcuate configuration similar to that of section 64. The section 72 is relatively short however, and merges at junction 74 with the free end section 56 of the arm portion, which free end section initially is inclined upwardly and away from the base portion 28. The arrangement is such that the arm sections 64, 68 and 70 combine with the base portion to provide a loop for receiving the workpiece or pipe, which loop initially has an open mouth 76 defined by the upwardly inclined free end portion 56 for facilitating reception of the workpiece.

Outwardly flaring short flanges 78 and 80 are formed along the opposite side edges of the arm portion 30. As shown in the drawings, these flanges extend along a major portion of the arm section 64, entirely along the arm sections 68 and 70 and for at least a short distance along the arm section 56. While the arm portion is made of relatively soft sheet metal and is adapted to be formed around the workpiece as described below, the flanges 78 and 80 provide strength and rigidity for insuring tight clamping of workpieces, particularly workpieces of smaller diameters. Furthermore, these flaring flanges 78 and 80 provide flaring mouths 82 and 84 at opposite longitudinal ends of the loop whereby to minimize the possibility of a sharp edge engaging and digging into the workpiece or pipe as shown in FIG. 5.

If desired, the arm portion 34 may be adapted for accommodating pipes or workpieces of different sizes in the same manner as the arm portion 30. However, in the embodiment shown, the arm portion 34 is intended primarily to accommodate a single size. Thus, this arm portion comprises an arcuate section 86 extending between the junction 36 with the base portion and a junction 88 with the free end section 58. The curvature of the arcuate section 86 has a radius greater than the radius of the workpiece 26 and is related to the radius of the workpiece 26 so that when the free end portion 58 of the arm is clamped against the base portion as shown in FIG. 2, the curved section 86 will tightly grip the workpiece 26.

The arm portion 34 is provided with outwardly flaring flanges 90 and 92 along opposite side edges thereof. These flanges which extend around the curved section 86 and into the free end section 58 are similar in structure to and serve the same function as the previously described flanges 78 and 80.

When assembling the clip with the workpieces or pipes, the parts are relatively manipulated so that the pipes pass between the free ends of the arm portions and the workpiece 24 enters the looped part of the arm portion 30 and the workpiece 26 enters the looped part of the arm portion 34 as shown in FIG. 1. Then the free end sections of the arm portions are manually depressed sufficiently to bring the openings 60 and 62 therein into alignment with the opening 54 in the base portion and the shank 48 of the threaded fastener or screw is inserted through the aligned openings and into the aperture 52. Upon tightening of the fastener member 48, the free end 58 of the arm portion 34 is clamped against the base portion 28 and this action causes the curved section 86 to be drawn tightly around the workpiece 26. At the same time, the free end section 56 of the arm portion 30 is clamped tightly against the end section 58 of the arm portion 34. The action is such that the curved section 64 is bent around and substantially conforms to the curvature of the relatively large diameter workpiece or pipe 24. In addition, the relatively sharp angular relationship between the curved section 64 and the straight section 68 tends to cause the arm portion to bend at the junction 66 rather than along the straight portion 68 so that the straight portion tends to move toward an imaginary line providing a chord of an imaginary circle partially defined by the arcuate section 64.

However, in the installation shown in FIGS. 1 and 2, the diameter of the workpiece 24 is similar to that of the imaginary circle of the arcuate section 64 so that the straight section 68 is forced firmly against the surface of the workpiece 24 and is bent therearound as indicated.

FIG. 3 shows the clip member assembled with a smaller diameter workpiece 24' and more clearly demonstrates the manner in which the arm portion bends relatively sharply at the junction 66 so that the initially straight section 68 tends to assume a chordal position for insuring that it will engage and firmly clamp the smaller diameter workpiece.

FIGS. 7 through 11 show a modified form of the present invention which is similar to the structure described above as indicated by the application of identical reference numerals with the suffix a added to corresponding elements. As indicated above, the previously described clip 20 is preferably formed from a soft relatively easily bendable sheet material or metal. In the modified embodiment, the clip member 20a is stamped or otherwise formed in one piece from sheet metal such as steel, but the processing is such that the end product comprises spring steel rather than a soft metal so that the clip 20a is adapted firmly and resiliently to clamp workpieces or pipes of different diameters as will be described below.

In the embodiment of FIGS. 7—11, the clip member 20a has a base portion 28a with longitudinally extending rigidifying ribs 100 and 102 formed therein. Prong means 38a is, in this embodiment, formed by a pair of fingers 104 and 106 extending axially in generally parallel spaced relationship from the base portion 28a and having barbs or shoulders 108 and 110 adapted to be snapped through an aperture in the support 22a.

Arcuate section 64a of arm portion 34a extends so that it is adapted to curve upwardly and over a workpiece or pipe and, in this embodiment, rather than providing the arm portion with a straight section merging directly with the section 64a, a relatively straight finger section 68a is included and is arranged so as to extend within the arc of the imaginary circle partially defined by the section 64a. More specifically, the finger section 68a is struck from the material of the arm portion 30a and extends from a point substantially at junction 74a within and beneath the section 64a as shown in FIG. 7. Preferably, the finger section has a free end portion 112 which is curved and adapted to hook around the workpiece or pipe.

When the arm portion 30a is clamped by the threaded fastener or screw 48a as shown in FIG. 8, the relatively straight resilient finger section 68a is forced against the workpiece or pipe 24a. When the pipe 24a has a relatively large diameter as shown in FIG. 8, the spring finger section 68a is deflected and formed outwardly by the pipe so that it conforms substantially to the pipe. However, when the pipe is of a relatively small diameter as indicated by workpiece 24a' in FIG. 9, the resilient finger element while continuing to resiliently and firmly engage and clamp the workpiece, is not deflected and formed outwardly to the same extent as indicated in FIG. 8.

It was previously indicated that both arm portions of clip member 20 could be constructed for accommodating pipes or workpieces of different diameters, if desired. This feature is shown in FIGS. 7 through 11 wherein the arm portion 34a and the clip member 20a is adapted for accommodating pipes of different diameters. More specifically, the arm portion 34a is formed with a resilient relatively straight finger section 114 which functions in the same manner as the finger section 68a.

In the embodiment of FIGS. 7 through 11, screw accommodating openings 60a and 62a in the finger portions 30a and 34a are in the form of complementary semicircles in the terminal ends of the finger portions. These terminal ends also have downwardly deflected stop or abutment providing marginal flanges 116 and 118 cooperating with protuberances 120 and 122 also downwardly deformed from the end sections of the finger portions for limiting clamping of the finger portion end sections toward the base portion in a manner such that the main body of each of the end sections is slightly spaced above the base portion as shown in FIG. 9.

The base portion has pairs of spring fingers 124—126 and 128—130 struck therefrom and respectively projecting diagonally upwardly toward the loop provided by the finger portion 30a and the loop provided by the finger portion 34a. The arrangement is such that these spring fingers serve to engage the arm portions 30a and 34a when the arm portions are clamped by the screw or fastener 48a so as to provide a spring-locking action for resisting loosening of the screw. In addition, these spring fingers project into the open mouths of the loop sections of the arm portions before the clamping action takes place as shown in FIG. 7 and serve to aid in retaining the workpieces within the looped sections until the screw can be tightened.

While preferred embodiments of the present invention have been shown and described herein, it is obvious that many structural details may be changed without departing from the spirit and scope of the appended claims.

I Claim:

1. A clip for securing elongated workpieces such as pipes, tubing and the like to a support comprising a base portion, an arm portion extending outwardly from an integral junction with and doubled back over said base portion for retaining a workpiece positioned between the arm portion and the base portion, parts of said arm portion and said base portion spaced from said junction being adapted to be relatively clamped toward each other, said arm including a first section extending generally outwardly from said base portion for partially defining an imaginary circle enclosing the workpiece when the clip is assembled with the workpiece, means engageable with and formable around a workpiece comprising a second section of said arm including an initially generally straight section extending at an angle from said first mentioned section and movable toward a chordal position relative to said imaginary circle when said parts of the arm portion and base portion are clamped toward each other, said arm portion being formed from relatively soft deformable metal and said second section of said arm which normally extends within said imaginary circle engaging the workpiece and adapted to be deformed by an oversized workpiece when said parts of said arm and base portion are relatively clamped toward each other.

2. A clip for securing elongated workpieces such as pipes, tubing and the like to a support comprising a base portion, an arm portion extending outwardly from an integral junction with and doubled back over said base portion for retaining a workpiece positioned between the arm portion and the base portion, parts of said arm portion and said base portion spaced from said junction being adapted to be relatively clamped toward each other, said arm including a first section extending generally outwardly from said base portion for partially defining an imaginary circle enclosing the workpiece when the clip is assembled with the workpiece, said arm further including a second relatively straight section having an integral junction with said first section and extending at an angle from said first section, said second relatively straight section providing means selectively engageable with and formable around workpieces of substantially different diameters when said parts of said arm and said base portion are relatively clamped toward each other.

3. A clip, as defined in claim 2, which includes a second arm portion extending outwardly from an integral junction with and doubled back over said base portion toward said first arm portion for retaining a second workpiece positioned between said second arm portion and said base portion, said first and second arm portions having adjacent end sections, said adjacent end sections including means for receiving a fastener for clamping said end sections toward said base portion.

4. A clip, as defined in claim 2, which includes prong means integral with and extending from said base portion oppositely from said arm portion and insertable into an aperture in said support for connecting the clip with respect to the support.

5. A clip for securing elongated workpieces such as pipes, tubing and the like to a support comprising a base portion, an arm portion formed from resilient spring material extending outwardly from an integral junction with and doubled back over said base portion for retaining a workpiece positioned between the arm portion and the base portion, parts of said arm portion and said base portion spaced from said junction being adapted to be relatively clamped toward each other, said arm portion including a first section extending generally outwardly from said base portion for partially defining an imaginary circle enclosing the workpiece when the clip is assembled with the workpiece, a second section of said arm normally extending within said imaginary circle for engaging the workpiece, said second mentioned section of the arm portion comprising a resilient spring finger deformable by the workpiece when said parts of said arm and base portion are relatively clamped toward each other, additional spring finger means integral with and projecting from said base portion for initially retaining workpieces between said first mentioned spring finger and said base portion and for resiliently engaging said arm portion when the arm portion is relatively clamped toward the base portion by a fastener for providing a spring locking action resisting loosening of the fastener.